United States Patent
Gholizadeh

(10) Patent No.: US 10,507,450 B2
(45) Date of Patent: Dec. 17, 2019

(54) PROCESS OF CHEMICAL REACTION IN MAGNETIZED SOLVENTS

(71) Applicant: Mostafa Gholizadeh, Mashhad (IR)

(72) Inventor: Mostafa Gholizadeh, Mashhad (IR)

(*) Notice: Subject to any disclaimer, the term of this patent is extended or adjusted under 35 U.S.C. 154(b) by 366 days.

(21) Appl. No.: 15/338,325

(22) Filed: Oct. 29, 2016

(65) Prior Publication Data

US 2018/0117562 A1    May 3, 2018

(51) Int. Cl.
  *B01J 19/08* (2006.01)
  *C01B 5/00* (2006.01)
  *C04B 22/00* (2006.01)
  *C02F 1/48* (2006.01)
  *A23K 10/00* (2016.01)
  *C02F 103/02* (2006.01)

(52) U.S. Cl.
  CPC .......... *B01J 19/087* (2013.01); *A23K 10/00* (2016.05); *C01B 5/00* (2013.01); *C02F 1/482* (2013.01); *C04B 22/002* (2013.01); *B01J 2219/085* (2013.01); *B01J 2219/0877* (2013.01); *C02F 2103/023* (2013.01); *C02F 2303/08* (2013.01); *C02F 2303/22* (2013.01)

(58) Field of Classification Search
  CPC .......... B01J 19/087; B01J 2219/085; B01J 2219/0877; C02F 1/482; C02F 2103/023; C02F 2303/22; C02F 2303/08; C04B 22/002; A23L 33/19; C01B 5/00
  See application file for complete search history.

(56) References Cited

U.S. PATENT DOCUMENTS

| | | | | |
|---|---|---|---|---|
| 5,540,835 A | * | 7/1996 | Sanderson | C02F 1/481 210/167.29 |
| 5,584,994 A | * | 12/1996 | Hattori | C02F 1/48 210/195.1 |
| 7,326,339 B1 | * | 2/2008 | Hatton | C02F 1/481 210/195.1 |

OTHER PUBLICATIONS

AQUA Correct—The Stainless Steel Water Conditioner Brochure. (Year: 2019).*
Afshin et al; Improving Mechanical Properties of High Strength Concrete by Magnetic Water Technology; Transaction A: Civil Engineering, 2010, 17(1), 74-79; Iran.
Hafizi et al; Effects of Magnetized Water on Ovary, pre-implantation stage endometrial and fallopian tube epithelial cells in mice; Iran J Reprod Med, vol. 12. No. 4. pp. 243-348, Apr. 2014.
Gholizadeh et al; Effect of magnetic field on property of a non-aqueous solvent upon complex formation between kryptofix 22DD with yttrium (III) cation; J Iran Chem Soc (2014) 11:947-952.
(Continued)

*Primary Examiner* — David A Reifsnyder
(74) *Attorney, Agent, or Firm* — Azadeh Saidi

(57) ABSTRACT

One of the chief purposes of researchers in the field of chemistry is to perform chemical reactions at high rates; a method that can be adopted to achieve such goal is to perform reactions in magnetized solvents. Being passed through the Solvents Magnetizing Apparatus (SMA) magnetizes the solvent, and the magnetic property remains intact for a few days, while most chemical reactions are done in less than one day. It should be taken into consideration that the magnetized solvent is different from the Zeeman effect in chemistry. This technology is widely used in performing chemical processes of most chemical reactions.

7 Claims, 7 Drawing Sheets

(56) References Cited

OTHER PUBLICATIONS

Gilani et al; Measurement of Acid-Binding Capacity for Poultry Feedstuffs in Deionized and Magnetized Water; Iranian Journal of Applied Animal Science (2013) 3(4), 687-694.
Gilani et al; Assessment of magnetized drinking water on excreta quality, nutrients digestibility, serum components and histomorphology of digestive tract in broiler chickens; Res. Opin. Anim. Vet. Sci, 2014, 4(3), 120-127.
Hashemizadeh et al; The possibility of enhanced oil recovery by using Magnetic Water Flooding; Petroleum Science and Technology, 32: 1038-1042, 2014.
Moosavi et al; Magnetic effects on the solvent properties investigated by molecular dynamics simulation; Journal of Magnetism and Magnetic Materials 354 (2014) 239-247.

\* cited by examiner

PROCESS OF CHEMICAL REACTION IN MAGNETIZED SOLVENTS

BACKGROUND OF THE INVENTION

The effect of magnetic field on water was discovered in the early 1900s by Danish Physicist Hendricks Anton Lorenz. In his discovery, the parotic solvent (i.e. water) was exposed to a magnetic field. His observation demonstrated that by passing water through the magnetic field, the electron pattern in the ions has been changed. It is also reported that when water exposed to an external magnetic field, different phenomena would happen and magnetization leads to the increase in water viscosity, surface tension and enthalpy; meanwhile, influence the hydrogen bond distribution. All these changes in solvent properties increase the molecular interactions.

Scientists investigated the influence of magnetic field on changing macroscopic features and microscopic structures of water. They found some alterations in the properties of water when it exposed to the magnetic field. They had measured changes in surface tension, soaking effect or angle of contact, viscosity, rheology features, refractive index, dielectric constant and electric conductivity of magnetized and pure water by using infrared, Raman, visible light, ultraviolet and X-ray techniques.

It was concluded that although distribution of molecules and transition probability of valence, bonded and inner-layer electrons were varied, the constitution of molecules and atoms was not changed. In addition, they illustrated that the magnetic field has decreased contact angle, surface tension force and hydrophobicity of water; while the refractive index, dielectric constant and electric conductivity of water have been increased. The viscosity of magnetized water have also increased by reducing intensity of magnetic field and magnetized time.

A SUMMARY OF THE INVENTION

A magnetized solvent may be produced by passing organic and aqueous solvents through the Solvents Magnetizing Apparatus (SMA). The basic purpose of making the SMA is not only to change the solvents' performance, but also to increase the rate and selectivity of chemical reactions performed in such solvents. It should be noted that both better solvation of the reactants and decrease of the drag in surface occur in this method. In this respect, changes must be made to the pump used and its washers. This instrument is used in various industries such as food industries, automobile industries, petroleum and petrochemical industries, basic sciences, civil engineering, medical sciences etc.

DETAILED DESCRIPTION OF THE SPECIFICATIONS

Figure 1:
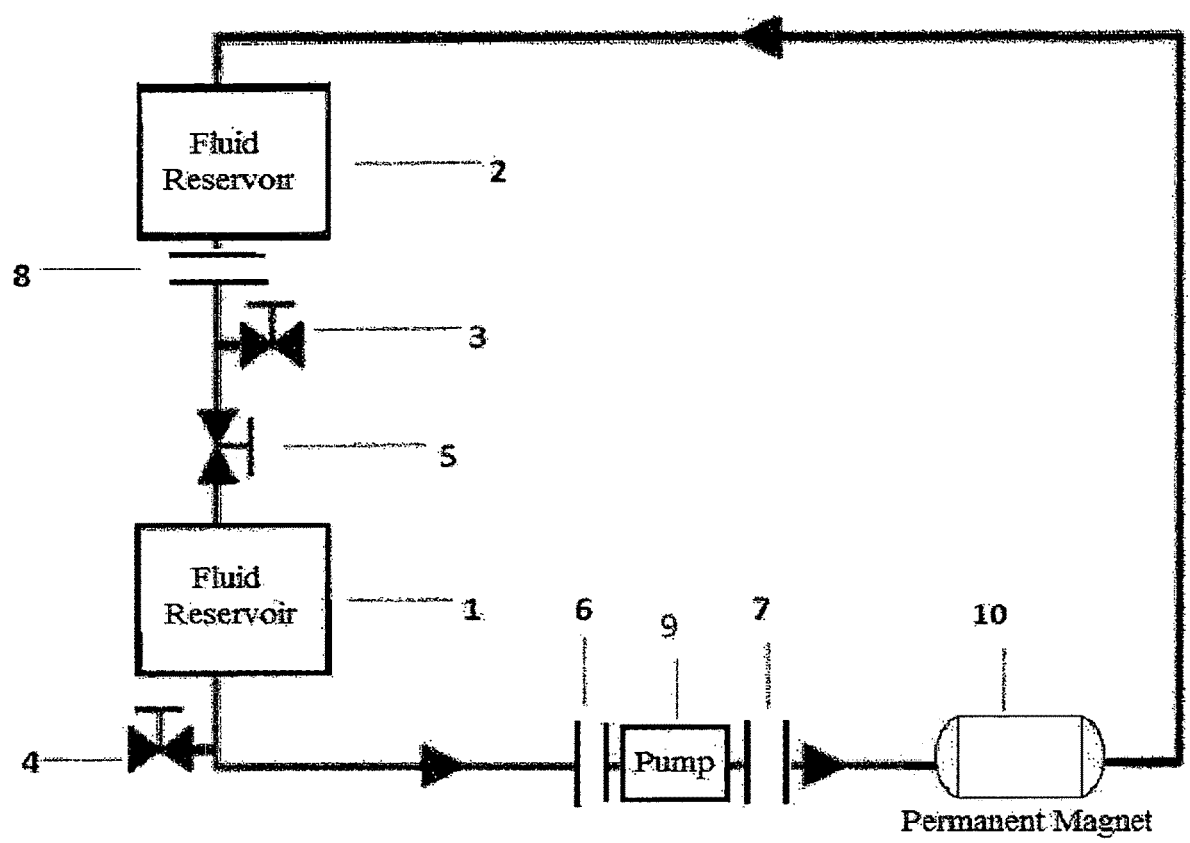
FIG. 1 displays the Magnetizing apparatus of solvents (SMA).

The Solvents Magnetizing Apparatus (SMA) (FIGS. 1 & 2) is made of stainless steel 316 with two solvent containers (1 and 2), and sampling valves (3 and 4) placed right after the solvent storage. There is a linking valve (5) between the two containers (1) and (2). These connections are linked via a ¾ in. steel pipe. There is a flange (8) between the container (2) and the first sampling valve (3) and also between the second sampling valve (4) and the steel pump (9). Finally there is a flange (7) between the stainless steel pump (9) and the AQUA CORRECT device (10) (The static magnetic field in a compact form a unit called "AQUA CORRECT" was used. The solvent container (2) is directly connected to the AQUA CORRECT device (FIGS. 1 and 2) and the coaxial magnetic system (not shown) is also directly connected to the AQUA CORRECT device (not shown).

Figure 3:
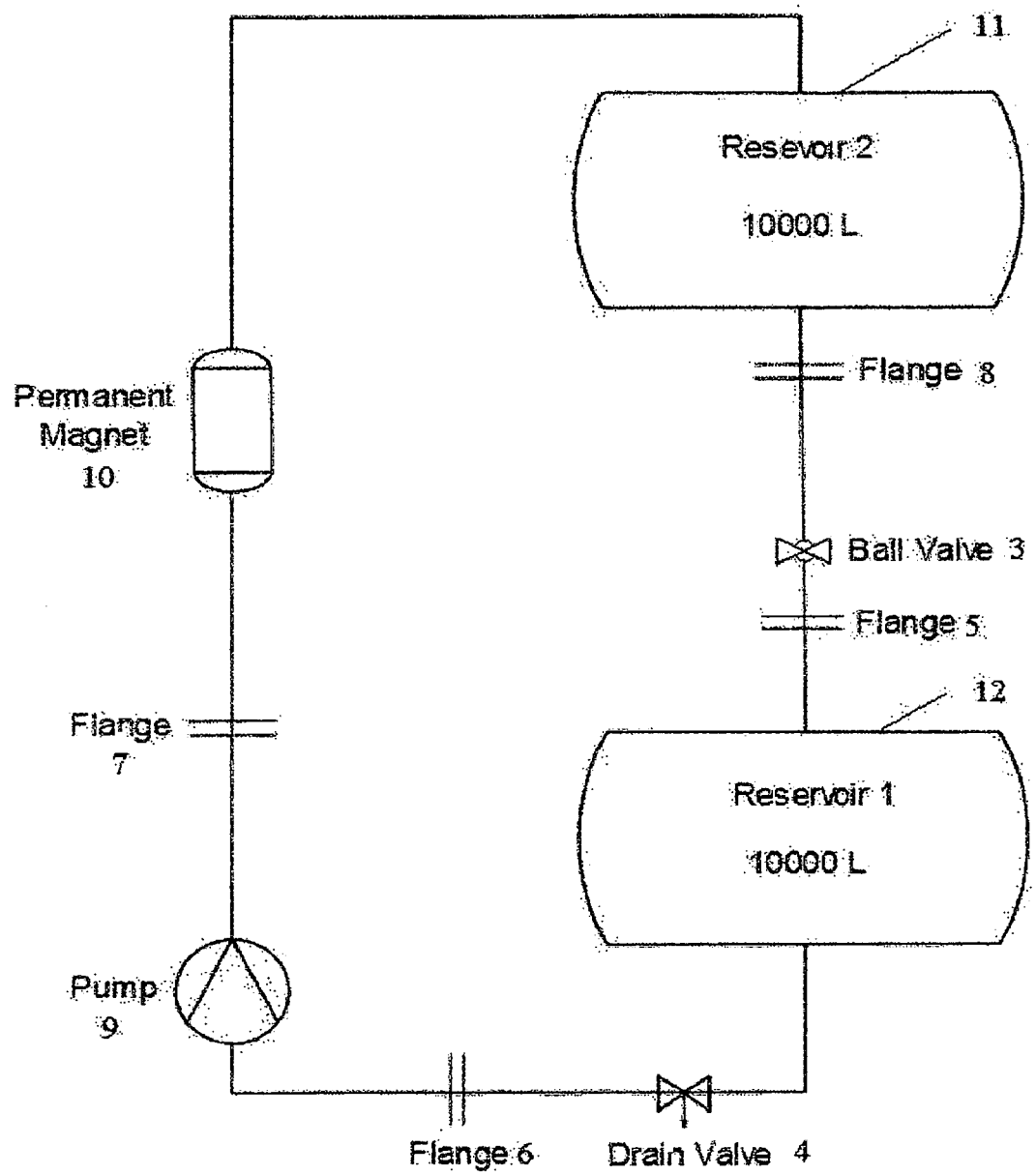
FIG. 3 is a sample of an SMA system at an industrial scale used in concrete-making industry.
Figure 4:
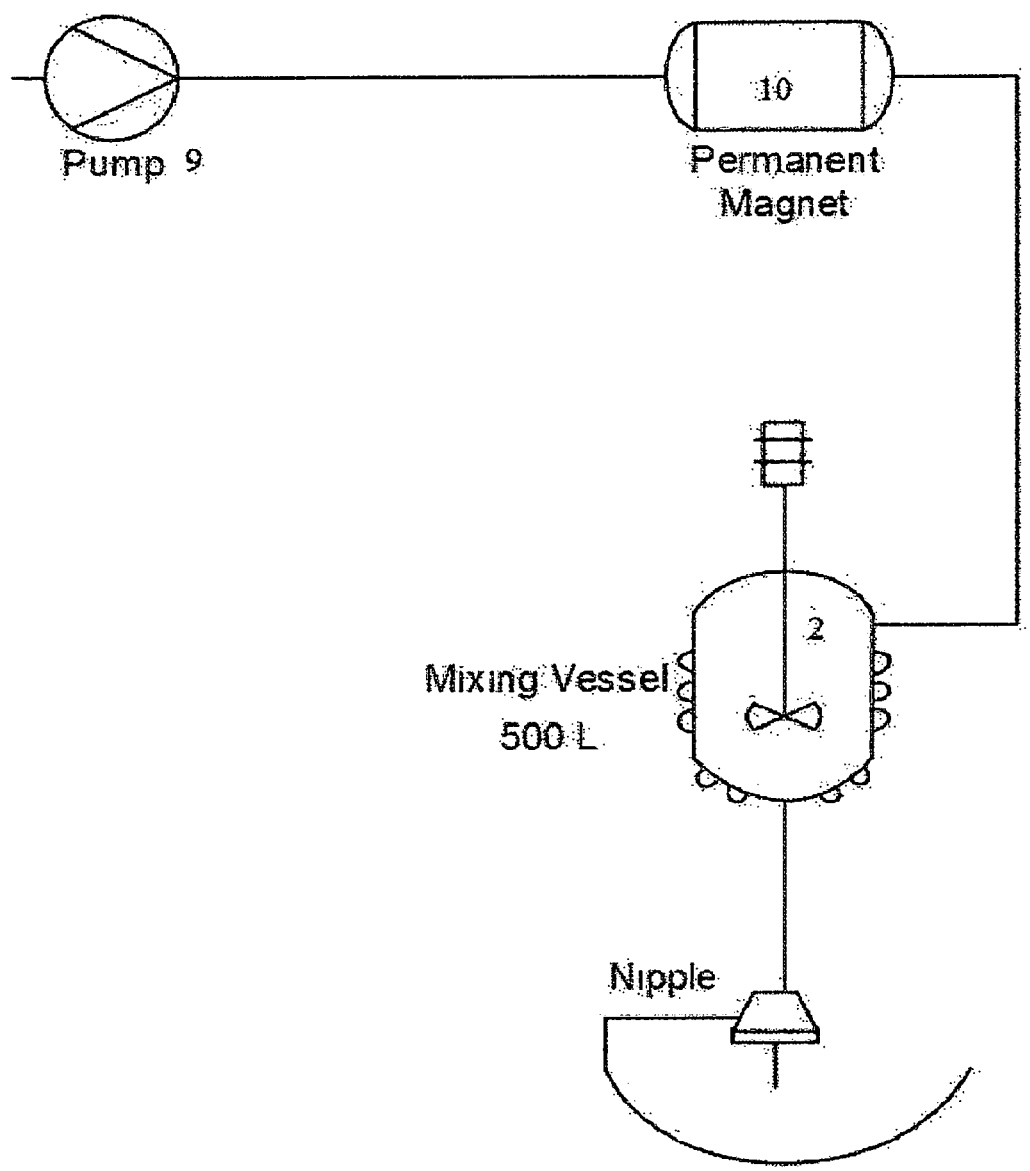
FIG. 4 displays one of the best modes of the apparatus.
Figure 5:
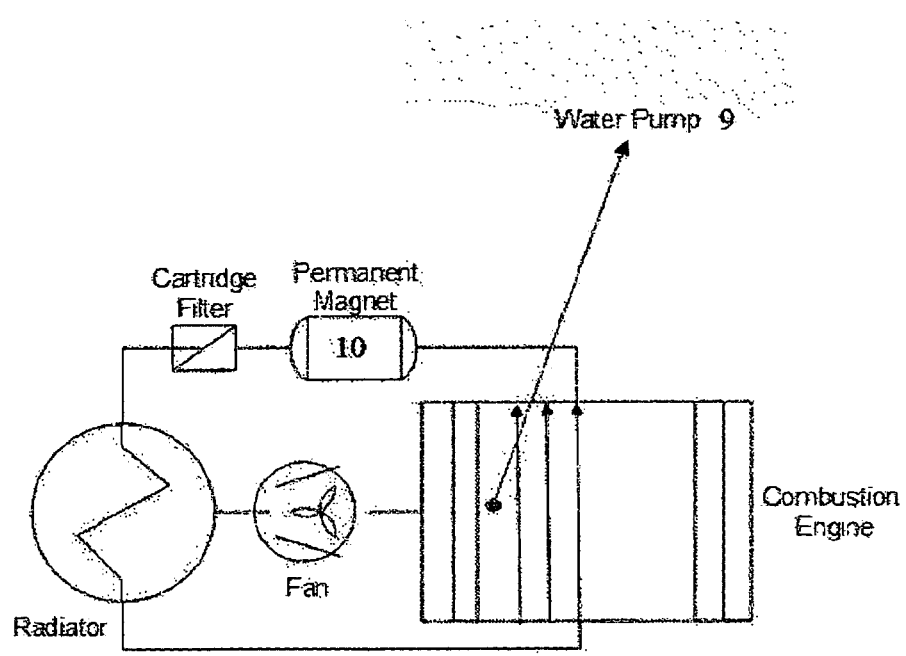
FIG. 5 displays an automotive engine cooling system
Figure 6:
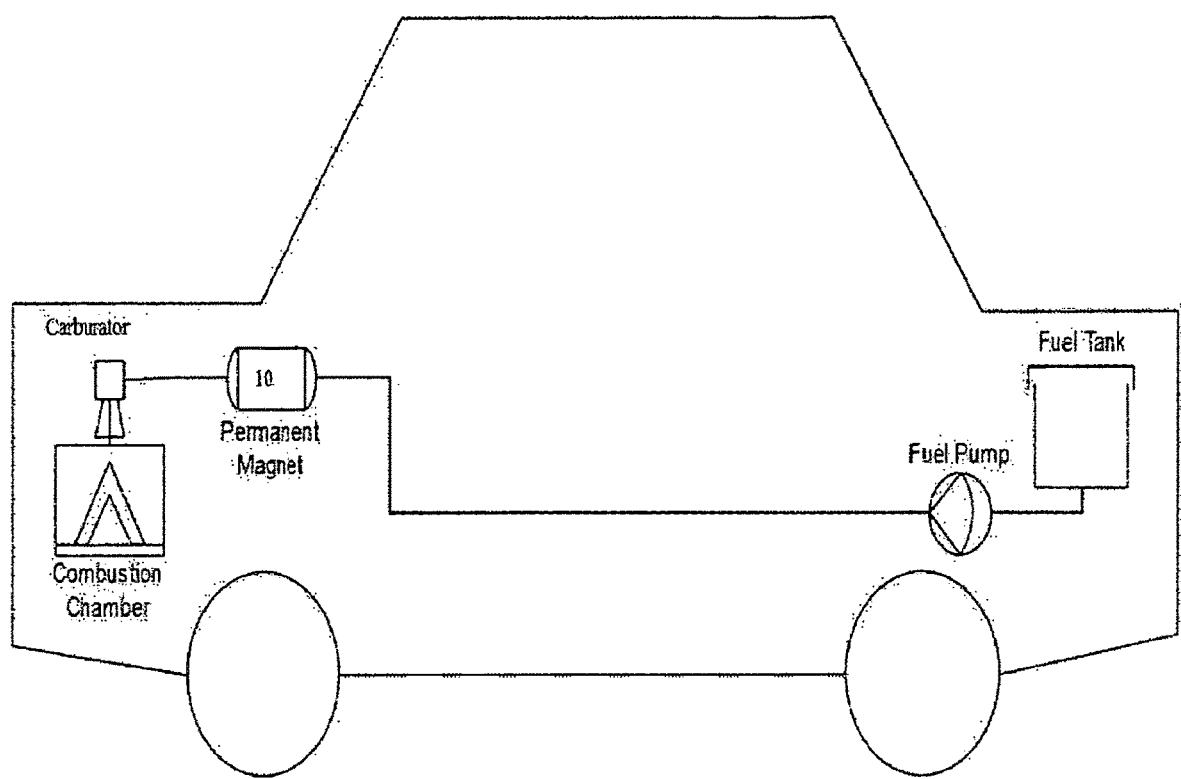
FIG. 6 displays a vehicle's fuel system

The SMA has a coaxial static magnetic system of 6000G field strength that in conjunction with the AQUA CORRECT (imported from Germany HPS Co. [DN=20, ¾ in. flow rate 2m3/h])) device create a variable magnetic field from 3000 to 20000 Gauss (measured by a Gauss meter, not shown). Containers (1) and (2)'s lids are indicated as (11) and (12). FIG. 3 is a sample of a SMA at industrial scale used in concrete-making industry. All washers in flanges and pump seals should be made of PTFE (Poly Tetra Fluoro Ethylene) and be trimmed accordingly so that they would be insoluble in organic/inorganic acids and various solvents.

On the other hand, when building the SMA, argon welding must be used so that the welded spots would not be corroded when exposed to various solvents. In addition, when making the SMA, prevent installing too many flanges and bends to prevent possible turbulence that may lead to the reduction or loss of the induction magnetic property. It should be noted that when the AQUA CORRECT is installed on the system, welding should be avoided in order to prevent the undesirable effect on the magnetic property of the AQUA CORRECT device.

In addition, in order to clean the AQUA CORRECT, remove it from the device every 6 months; clean it with a piece of cloth and then reinstall. It is worthy to mention that during the operation of the device, the solvent gets warm; such temperature changes do not influence the solvent magnetization.

On the other hand, it should be considered that the magnetic field does not affect a static particle; the more the movement speed of particles in the field, the more will be the induced magnetic property. Therefore a stainless steel pump with high strength and speed is required [Flow rate 0.77 m/s (1.56 ml/s)].

Magnetized solvent has been applied in various industries, such as food industries (magnetized chicken nourishment), automobile industries (protection of the cooling system and optimization of fuel consumption in internal combustion engines in a magnetic manner), civil/structure engineering industries (preparation of different types of magnetized concretes), magnetic protection of industrial boilers, petroleum and petrochemical industries (optimization of petroleum extraction from wells through magnetic acidification) and analytical chemistry (effect of the magnetic field on 18-crown-6) ether crown with potassium ion, etc. (FIGS. 1-7).

Operation of SMA

Pour the solvent into the container (1) and close the linking valve (5). By turning the pump (9) on, the solvent passes the AQUA CORRECT magnetic device (10) as well as the coaxial magnetic system (not shown) to enter the container (2). This solvent is called "the once-magnetized solvent". The faster the solvent passes the magnetic field, the more will be the property of the induced magnetic field.

The linking valve (5) may be opened to allow the solvent being magnetized for longer if necessary, for example 10, 30, 60, 120, 180 . . . minutes. The best magnetization time for some reactions was deduced to be 3 hours, though it may vary depending on the type of reaction.

Most chemical reactions are performed in less than one day; this may increase the rate of many chemical reactions and affect their selectivity.

It is important to know that the induced magnetic property through this method is different from the Zeeman effect, since for chemical reactions it was declared that the equivalent orbitals p, d, and f are cleaved when exposed to a magnetic field and return to their original state after passing the magnetic field, and the induced magnetic property will be lost then. However, in this method, the induced magnetic property remains intact for more than a few days, being able to be transferred to the components of reactants by the solvent.

In addition, the induced magnetic property durability increases with increasing the strength of the magnetic field from 3000 to 20000 Gauss. Therefore, it contradicts with the Zeeman effect; as a new phenomenon, it may considerably help the performing of chemical reactions and provide new research fields for the researchers of various scientific fields.

FIELD OF USE

Magnetized solvents have been applied in various industries some of which are mentioned below as examples:

Food Industries (Magnetized Chicken Nourishment)

The chemical properties of magnetized water on poultry characteristics before and after the magnetic instrument was studied. They were weighted by an analytical balance at the end of every week. This method was applied to the magnetized and non-magnetized groups in a period of sixty days. After weighting all samples for each group the medium weight were calculated.

Repeatability of above mentioned method was examined during two years. Using water without additives and applying the magnetic treatment technology resulted in no traces scale deposits on the surface of the poultry's pipelines and installation. The old poultry's installation system on which the instrument had been previously installed, without the Aqua Correct, demonstrated a badly internal corrosion in pipeline and because of the formation of a thick coating of insoluble salts, before its being connected to the equipment.

After being connected with the magnetic apparatus, the installation system and pipeline were automatically cleared and the solid material became loose and fell off. Thus the life span of the installation system of poultry expectantly increased.

The magnetic device (combination of the AQUA CORRECT device and the coaxial magnetic system) never affected the properties of the water. Its properties and qualities unchanged and pH had no effect on the scale formation due to the use of the equipment FIG. 4. Thus, the poultry can take benefit some of the following advantages when it is being connected to the magnetic device as followed:

Considerably increasing the effect of antibiotics on poultries' infections

Increasing the solubility of vitamin solutions and electrolytes in magnetized water Decreasing viral respiratory diseases such as bronchitis, Gambro, Newcastle, influenza Decreasing secretions in poultries' respiratory system during nourishment Decreasing the amount of fat in chickens fed by magnetized water Minimizing the microbial infections related to basil and *salmonella* in chickens' bodies fed by magnetized water proved through autopsy during nourishment Increasing the vitality of the chickens under study Gaining of 150-200 gr weight in chickens fed by magnetized water, observed at the end of the poultries nourishment period Automobile Industries (Magnetic Protection of the Cooling System)

Vehicles are protected from sediments by using the Solvent (water) Magnetizing Apparatus to protect the water-circulation system from corrosion.

Installing a magnet along the water-circulation system path in internal combustion engines prevents the cooling system from the accumulation of sediments. Putting a bullet filter along the water-circulation system path after the SMA leads to the collection of floating sediments in it. Applying method, the old sediments along the water-circulation (cooling) system path are also removed FIG. 5.

Automobile Industries (Optimization of Fuel Consumption in Internal Combustion Engines)

Letting the fuel pass through the magnetizer would lead to the separation of the clusters from each other, due to the fact that by passing the fuel, which is completely non-polar, through the magnetic field, the fuel components—hydrocarbons—are partially loaded. These loads make repulsions among the components of a cluster leading to their separation. Considering the fact that unlimited absorption of the air oxygen is possible inside every carburetor or inside the motor, sufficient oxygen reacts with these loaded particles to produce the maximum heat energy; as a result, a longer distance may be generated with a fixed amount of fuel. In other words, fuel optimization is observed in internal combustion engine-based devices through this method FIG. 6.

Civil/Structure Engineering Industries (Preparation of Different Types of Magnetized Concretes)

For magnetization of water, SMA was used for the first time in the production of concrete. Also, a pump was used for the circulation of water in the magnetizer. The water flow value was 2.26 liter/min and the water circulation time in the device was equal to 15 minutes FIG. 3.

It can be concluded that the effect of the magnetic field will increase at higher cement content, w/c ratio and super plasticizer percent, and the slump of the samples will improve. The reason for this phenomenon can be explained as follows.

In mixtures with higher cement content, we also need more water for surrounding the cement participates and, faced with the low gathering of molecules in magnetized water and, in this regard, in the case of magnetized water, we need to lower the water volume for the surrounding cement particles and, as a result, a high rate of water shall be applicable for more efficiency.

Subject to more lubrication of the magnetized concrete mixtures with a rate of water higher than the amount of cement, it should be mentioned that an effective part of the magnetized mixture is changed to mixed water and, for as long as the higher rate of this water in the concrete mixture exists, its effect also shall be higher. It is observed that in mixtures with higher water to cement ratios, the effect of the magnetic field is higher to improve the mixture efficiency.

Comparison between magnetized and non-magnetized concrete as a followed:

Increased concrete efficiency

Reduced amount of consumed water in concrete preparation

Prevention of particles concentration on a point to help better distribution of the concrete components The salient advantage: increase in the concrete's compressive and tensile resistances up to 25% and 40%, respectively Resistance to freezing in the concrete prepared from magnetized water A 10% reduction of surface drag in magnetized water which in turn decreases the hydrogen bond resulting in the reduction of molecular concentrations of water molecules from 13 to 5 or 6

Good results obtained from the Slump Test

Petroleum and Petrochemical Industries

Figure 7:
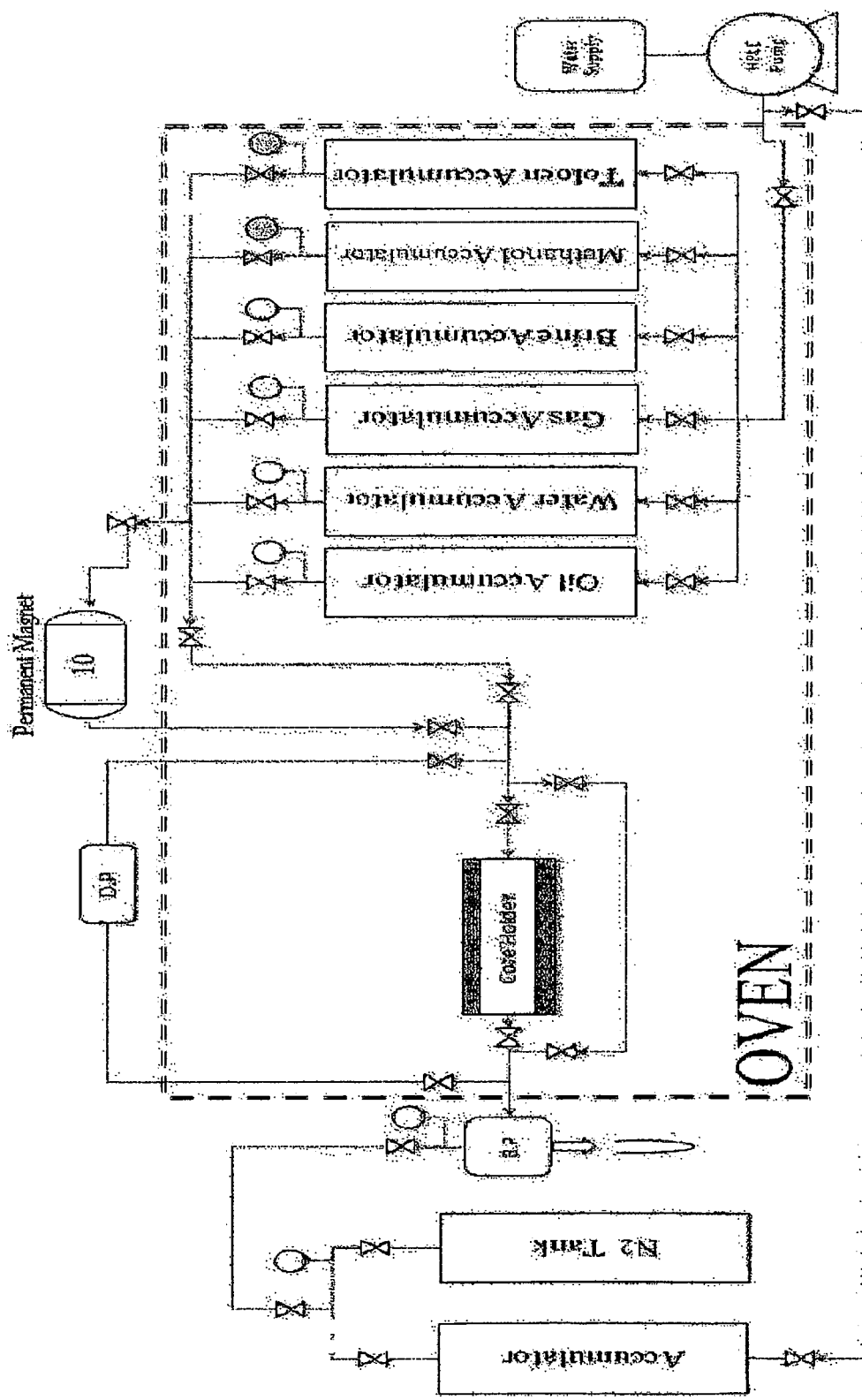
FIG. 7 displays an enhance oil recovery system in Petroleum and petrochemical industries

An enhance oil recovery system was used to measure the oil recovery as shown in FIG. 7. The accumulators and core holder have putted in an oven to simulate the reservoir temperature. The postulating fluid is injected to the core plug by means of a HPLC pump by selecting the appropriate valve. At the first, the core is saturated with brine, and then the reservoir oil is injected to the core. Thereby the core is prepared to water flooding. Three tests were taken with normal water, weak magnetized water, and strong magnetized water.

Applying this method, the magnetized acid is produced through passing 18% of chloric acid through the SMA with a proper rate. The extent of acid magnetization can be modulated by increasing the extent of the magnetic field.

According to Lorentz Force law, changing the rate, too, may modulate the extent of acid magnetization. However, the salient point is that the over-increasing of the rate may have a reversed effect on the extent of the acid magnetization.

The chloric acid formula is as below:

$$4HCl + O_2 \rightarrow 2Cl_2 + 2H_2O$$

This method optimized the petroleum extraction from petroleum wells up to about 10%.

Analytical Chemistry

Following the chemical reactions in magnetized solvents, the reaction of the effect of the magnetic field on the stability of the 18-Crown-6 ether complex with potassium ion was studied. During this reaction, the formation of the complex with potassium ion corresponding to the cavity size of 18-Crown-6 ether was examined and the complex formation decreased. In addition, the formation of the Kryptofix 22DD complex and yttrium (III) and Lanthanum (III) ions in methanol (organic) solvent were studied, and similar results were obtained regarding the reduction of the complex formation FIGS. 1-2.

Physical Chemistry

Simulation makes it possible to calculate and compare the system's physical-chemical properties including the mean square displacement (MSD), penetration and viscosity. The following table displays this comparison and makes it possible to analyze the effect of magnetic field on liquid properties.

Figure 2:
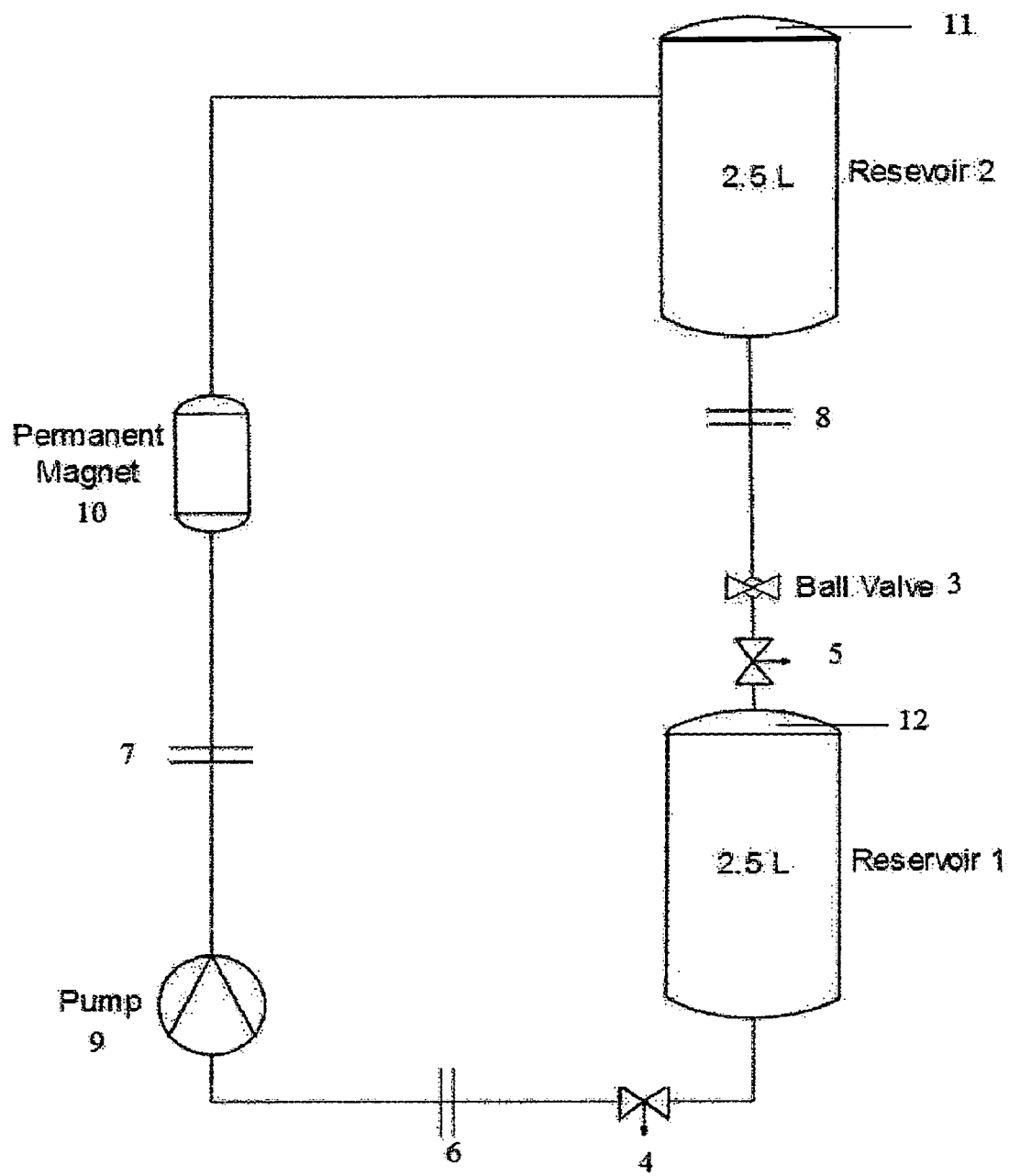
FIG. 2 displays another view of the apparatus.

According to such significant differences arising in the presence of magnetic field, it may be expected that the solubility of these solvents would change and therefore some extraordinary properties might be observable FIGS. 1-2.

Optimum conditions to use the SMA are as below:
1. The solvent magnetization time is considered as three hours.
2. The induced magnetic property in a solvent property remains intact for more than few days.
3. The rate of chemical reactions rises.
4. Chemical reactions selectivity increases.
5. Considering the fact that there is the possibility of hydrogen bond formation in proton-containing solvents, the number of formed hydrogen bonds increases and that would cause the performance of the solvent to be different from a typical one.
6. All washers and flanges of the device must be made of PTFE (Poly Tetra Fluoro Ethylene) that is not solved in any solvent.
7. This is the only instrument that is able to magnetize organic solvents as well as water, of which no report has been put forward yet.

The invention claimed is:

1. A solvent Magnetizing apparatus (SMA) comprising at least first and second fluid containers, at least first and second sampling valves, a linking valve located between said first and second containers connecting them together, a first flange connects said second container and said first sampling valve and a second flange connects said second sampling valve to a stainless steel pump, wherein a third flange connects said stainless steel pump to a magnetic generating device comprising an AQUA CORRECT device and a coaxial magnetic system; wherein in the combination of the two create a variable magnetic field strength of at least 3000 Gauss up to 20000 Gauss.

2. The apparatus of claim 1, wherein when said linking valve is open a solvent in said first fluid container by the force of said pump passes through said magnetic generating device and magnetized solvent directly enters said second container; said magnetized solvent is then magnetized repeatedly by opening said linking valve, allowing magnetized solvent inside said second container to enter said first container and pumps inside said magnetic generating device for further magnetization as needed.

3. The apparatus of claim 2, wherein said solvent and therefore said magnetized solvent comprises water, oil, acid, petroleum and fuel utilized in Food industries or Civil/Structure engineering industries or automobile industries.

4. The apparatus of claim 3, wherein said magnetized solvent when utilized in said food industries as magnetic chicken nourishment, increases an effect of antibiotics on poultries' infections and increases solubility of vitamin solution and electrolytes in magnetic water and also decreases viral respiratory diseases common amongst chickens.

5. The apparatus of claim 3, wherein said SMA system is installed and placed directly after a water tank of a cooling system of vehicles providing magnetized cooling fluid circulating inside said cooling system of said vehicles.

6. The apparatus of claim 5, wherein said SMA when installed directly after a fuel tank of said vehicles before said fuel enters an engine of said vehicles.

7. The apparatus of claim 3, wherein in petroleum and petrochemical industries said magnetized solvent comprises petroleum at said second sampling valve that is extracted from petroleum wells and stored inside said first fluid container and therefore optimizing said petroleum extraction to up to 10%.

\* \* \* \* \*